United States Patent
Meyer

(10) Patent No.: US 6,565,048 B1
(45) Date of Patent: May 20, 2003

(54) CABLE SUPPORT BRACKET ASSEMBLY

(75) Inventor: John S. Meyer, Cordova, TN (US)

(73) Assignee: Thomas & Betts International, Inc., Sparks, NV (US)

(*) Notice: Subject to any disclaimer, the term of this patent is extended or adjusted under 35 U.S.C. 154(b) by 0 days.

(21) Appl. No.: 09/631,799

(22) Filed: Aug. 3, 2000

Related U.S. Application Data

(60) Provisional application No. 60/146,872, filed on Aug. 3, 1999.

(51) Int. Cl.$^7$ .................................................. E21F 17/02
(52) U.S. Cl. ........................................................ 248/58
(58) Field of Search ........................... 248/68.1, 58, 62, 248/305, 65, 59; 174/40 CC, 166 R

(56) References Cited

U.S. PATENT DOCUMENTS

| | | | |
|---|---|---|---|
| 622,778 A | 4/1899 | Nordyke | |
| 887,272 A | 5/1908 | Robinson | |
| 2,285,632 A | 6/1942 | Urbain | |
| 2,317,825 A | * 4/1943 | Teas, Sr. .................. 248/62 X |
| 2,968,850 A | 1/1961 | Tinnerman | |
| 3,022,030 A | 2/1962 | Geer | |
| 3,042,352 A | 7/1962 | Stamper | |
| 4,039,131 A | 8/1977 | Perrault et al. | |
| 4,101,103 A | 7/1978 | Mooney et al. | |
| 4,709,888 A | 12/1987 | Cubit et al. | |
| 4,907,766 A | 3/1990 | Rinderer | |
| 5,092,546 A | 3/1992 | Wolfbauer | |
| 5,135,187 A | 8/1992 | Joas et al. | |
| 5,427,338 A | 6/1995 | Garrett et al. | |
| 5,522,571 A | 6/1996 | Simmons | |
| 5,542,631 A | 8/1996 | Bruno | |
| 5,730,399 A | 3/1998 | Baginski | |
| 5,740,994 A | 4/1998 | Laughlin | |
| 5,779,198 A | 7/1998 | Rutherford et al. | |
| 5,961,081 A | 10/1999 | Rinderer | |
| 5,988,570 A | * 11/1999 | Gretz .................... 248/68.1 X |

FOREIGN PATENT DOCUMENTS

| | | |
|---|---|---|
| CA | 1281217 | 3/1991 |
| DE | 26 42 785 | 4/1977 |
| GB | 1577726 | 10/1980 |

* cited by examiner

Primary Examiner—Ramon O. Ramirez
(74) Attorney, Agent, or Firm—Hoffmann & Baron, LLP

(57) ABSTRACT

The present invention provides cable support brackets particularly useful for category 5 cable, high performance communications cables, fiber optic cable, and the like. The cable support bracket is hook-like shaped body and includes an elongate stem portion, an elongate laterally extending portion extending generally perpendicularly from one end of the stem portion; and an elongate up-turned end portion extending perpendicularly from one end of the laterally extending portion, generally parallel to the stem portion. The stem portion, the laterally extending portion, and the end portion define a cable support saddle for accommodating cables thereacross with the laterally extending portion including a convex cable support surface that maintains a gradual bend radius for the cables extending thereacross. The cable support brackets may be suspended or mounted in a hinging manner on any surface in the utilitarian part of a building such as a wall, ceiling, joist, the area above a drop ceiling or similar such surface or area.

11 Claims, 15 Drawing Sheets

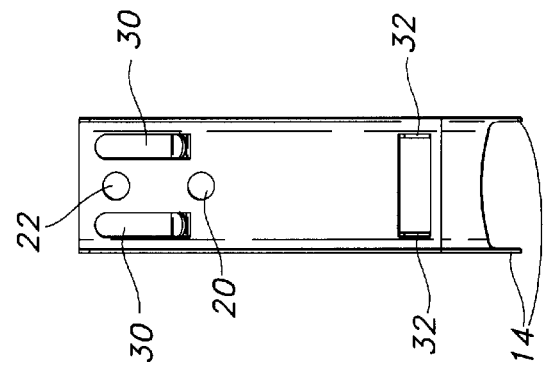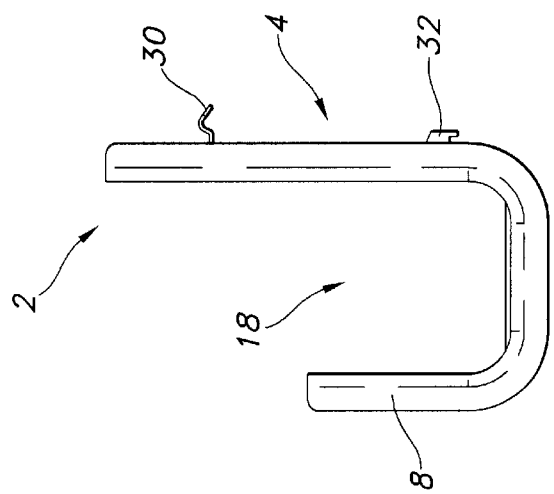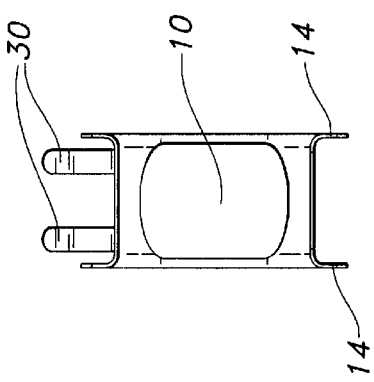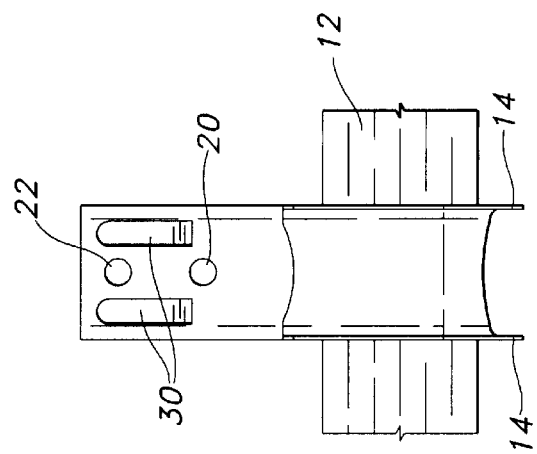

CABLE SUPPORT BRACKET ASSEMBLY

This application claims the benefit of U.S. Provisional Application No. 60/146,872, filed on Aug. 3, 1999.

FIELD OF THE INVENTION

The present invention relates generally to cable supports and more particularly, to cable support brackets that maintain the natural gradual bend radius of cables that extend thereacross. The present invention is particularly useful for category 5 cable and high performance communications cable, including fiber optic cable that may be suspended or mounted in a hanging manner on any surface in the utilitarian part of a building such as a wall, ceiling, joist, the area above a drop ceiling or similar such surface or area.

BACKGROUND OF RELATED TECHNOLOGY

As the computer and communications industries have grown, the organization and management of the cabling has become a serious problem. Cables have literally been dumped on the floor or dropped through walls, kinked around corners, or simply dropped on or dragged over the top of suspended ceilings. Cables such as UTP cables and fiber optic cables simply cannot be treated in such a cavalier fashion and have the equipment they serve meet expectations.

Attenuation, cross-talk, data distortion, and return loss all affect signal strength which can degrade any system transmission capability. Attenuation is the loss of power or signal strength along the transmission medium. Cross-talk is an unwanted transmission from another nearby cable, or even a pair in the same cable. Return loss is a measure of degree of impedance between the cable and a connector. Background noise is also an irritating problem resulting from a low signal-to-noise ratio. Inadequate cable installation is a key reason for such factors, especially when data and voice transmission speeds are continually being increased.

Such cables should not be kinked, snaked, bent sharply, tugged, sag excessively, or come into engagement with sharp edges, or be too close to power cables. The wiring can be placed under the floor with elevated flooring which is extremely expensive and often not practical. A more common place for such wiring is above the ceiling between the structural floor or roof above, and a dropped or acoustical ceiling. above, and a dropped or acoustical ceiling.

New buildings may be designed with such cables in mind and include cable trays. Cable trays are simply suspended or cantilevered trays in which such cables can be laid flat to extend horizontally, and hung or suspended from beams, joists, or decking for example, oftentimes by trapeze hangers. Such trays can be retrofitted into existing buildings, but not easily or economically, particularly if there is not a significant amount or extent of open or unobstructed horizontal space above the ceilings. For instance, the area above drop ceilings is typically cluttered with structural members such as beams or open joists, utilities such as plumbing or sprinkler systems, HVAC ducts, conventional power wiring, often encased in conduits, and suspension hangers for the ceiling and any lighting or other fixtures in the ceiling. Moreover, most beams, joists and other structures extend in a rectilinear fashion above a ceiling, while communications or data cabling usually radiates from a panel or closet in a star topology.

Conventional power wiring clips, snaps, wire hooks or bridle rings are not suitable for such cables because they may present sharp edges or produce sharp turns or kinks in the cabling, or they may crush or pinch a bundle. Attempts to overcome the shortcomings of conventional cable support systems have been met with limited success. Such an attempt is described in U.S. Pat. No. 5,740,994 issued to Laughlin, which discloses a cable support that includes a saddle with a flat center cylindrical surface section having edge flanges which extend away from the center at each edge at about 45° with no sharp edges to minimize kinking, bending or crimping of the cables.

Another attempt is described in U.S. Pat. No. 5,961,081 issued to Rinderer, which includes a support clip that is J-shaped hook having a central cable supporting portion and a retaining member. These conventional cable supports do not effectively support the natural gradual bend radius of the cables that extend across the cable support.

Accordingly, there is a need for a cable support that accommodates and supports the natural bend radius of the cables that lay thereacross. Such cable support is for the installation in utilitarian areas of a building, which can be fastened to or supported directly or indirectly from anything encountered.

SUMMARY OF THE INVENTION

The present invention provides a cable support bracket that advantageously accommodates, supports and maintains the natural gradual bend radius of suspended cables that extend across the support bracket.

In one embodiment of the present invention, there is provided a cable support having a hook-like shaped body including an elongate stem portion, an elongate laterally extending portion extending generally perpendicularly from one end of the stem portion; and an elongate up-turned end portion extending perpendicularly from one end of the laterally extending portion, generally parallel to the stem portion. The stem portion, the laterally extending portion, and the end portion define a cable support saddle for accommodating cables thereacross with the laterally extending portion including a convex cable support surface for maintaining a gradual bend radius for the cables extending thereacross. Support bracket of the present invention may be attached to a structure with fasteners, hangers, clips and combinations thereof.

The laterally extending portion of the support bracket is contiguous with both the stem portion and the end portion, with a short-radius right-angle transition between the main stem portion and the laterally extending portion as well as between the laterally extending portion and the end portion. The laterally extending portion extends between the stem and the end portion along a plane perpendicular to both the main stem portion and the end portion for a distance approximately equal to the length of the end portion, as opposed to a semi-circular configuration as would be present in a typical J-hook configuration. As such, the inventive support bracket is a hook-like shaped fastener, in a form of a modified "J" type structure formed by the stem, the laterally extending portion and the end portion defining the interior saddle area of the modified "J".

The interior saddle area defines the cable support saddle surface projecting in a generally planar manner along the laterally extending portion and along a general plane which is perpendicular to the main stem portion for supporting a cable. This cable support saddle surface has a convex curved surface extending along the axis of the hook in a direction of the cable. Such convex curved saddle surface includes a curved center portion which gradually slopes in a convex shape toward the side portions of the support bracket. This convex shape accommodates and maintains the natural gradual bend radius exhibited by the cables that extend across the cable support bracket.

The side portions of the support bracket sharply transition in a very short radius at an angle perpendicular to the general plane or axis of the cable supporting surface of the support bracket, forming opposing parallel flanges for strengthening the structure of the support bracket. Such opposing flanges are perpendicular to the general plane of the interior surface which defines the cable supporting surface and are parallel with respect to each other. The opposing flanges reinforce the strength of the support bracket and do not assist in supporting the cables being supported by the bracket. The flanges are situated so that they will not contact or affect the position of the supported cables.

In another embodiment of the present invention, the stem of the cable support bracket of the present invention includes a pair of hangers that are integrally formed from the support bracket by a cut-out portion of the planar surface of the stem portion. Such hangers permit attachment of the support bracket to a desired structure, such as a wall. Additionally, a pair of clips may be integrally formed from the support bracket by a cut-out portion of the planar surface of the stem. In this embodiment, the cable support bracket may also include fastener apertures located on the stem portion.

In yet another embodiment of the present invention, the stem includes non-threaded apertures therein that can accommodate conventional fasteners for securement of the bracket to a desired structure. Additionally, this embodiment may also include a pair of brackets and/or clips useful to secure the cable support bracket to a structure.

A cable supported by the interior surface of the support bracket can be maintained in place, for example, by wrapping a tie, such as a cable tie, about the cable and the support bracket in a cross-wise manner. More particularly, a cable tie can be wrapped about a cable supported within the support bracket such that the cable tie extends from the flange at one edge of the support bracket near the transition between the main stem portion and the laterally extending portion, wrapping around the cable, and extending to the opposing flange at the other edge of the support bracket near the transition between the end portion and the laterally extending portion. In this manner, the cable tie contacts the cable and maintains the cable in a tight manner within the interior surface of the support bracket against the cable supporting surface of the laterally extending portion.

With the support bracket attached to a wall or similar surface, a cable can be supported within the saddle of the support bracket in a hanging fashion. The support bracket is mountable on a wall, ceiling, joist, or similar such surface for supporting one or more cables, such as a bundle of fiber optic cables or the like, in a hanging manner. The support bracket can be quickly fastened to a wide variety of structures, walls or studs, beam or angle flanges, C-purlins or Z-purlins, with screw-on or hammer-on fasteners, or even drop wires, rods or vertical flanges with other types of fasteners. A number cable support brackets of the present invention can be assembled to each side of hanging tree bracket and the bracket in-turn secured to a beam flange or joist, for example with another fastener. The bracket can also be used inverted with yet another fastener to. elevate the support above the structure such as a Tee bar of a suspended ceiling grid. With the ability to secure the bracket support to anything, cables can be supported to avoid placing pressure or stress on the cable, or pinching or kinking the cable. The spacing may be such that excessive sag between supports is avoided.

BRIEF DESCRIPTION OF THE DRAWINGS

FIG. 1 is a plan view of the cable support bracket of the present invention.

FIG. 2 is a front plan view of the stem portion of the cable support bracket of the present invention.

FIG. 3 is a rear plan view of the stem portion of the cable support bracket of the present invention.

FIG. 4 is a plan view of the cable support bracket of the present invention.

DETAILED DESCRIPTION OF THE INVENTION

Figure 7:
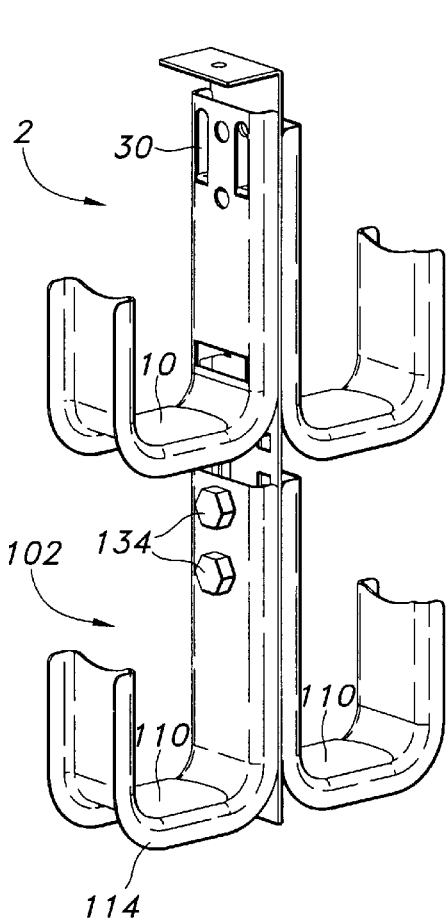
FIG. 7 is a perspective view of a number of cable support brackets of the present invention secured to a hanging structure.

Cable support bracket 2, useful for supporting cables, is shown in FIGS. 1–4. Cable support bracket 2 includes stem portion 4, elongate laterally extending portion 6 and elongate up-turned end portion 8. Elongate laterally extending portion 6 is generally perpendicular from one end of the stem portion 4 and elongate up-turned end portion 8 extends perpendicularly from the other end of the laterally extending portion and is generally parallel to stem 2. The configuration of stem 4, laterally extending portion and elongate up-turned end portion are in a hook-like shaped body.

Stem 4, laterally extending portion 6 and end 8 define the interior of cable support bracket, saddle area 18. Cable support saddle surface 10 accommodates cables 12 thereacross. Saddle surface 10 has a convex curved surface capable of supporting and maintaining the natural gradual bend radius of the cables that extend thereacross. Laterally extending portion 6 is contiguous with both, stem 4 and end 8.

A pair of outwardly extending contiguous reinforcing flanges 14 run along the longitudinal edges of bracket 2. Flanges 14 extend from both sides of support bracket 2 at a right angle from stem 4, laterally extending portion 6 and end portion 8. Flanges act to reinforce the bracket and extend from the cable support saddle so as to not interfere with the supported cables. Flanges 14 extend on both sides of support bracket 2 throughout the length of the support bracket including both, end portion 8 and stem 4.

As shown in FIG. 1, stem 4 has a height about twice the diameter of the laterally extending portion 4 and about twice the height of the elongate up-turned end portion. The stem includes several apertures useful in securing the support bracket to a structure. Apertures 20 and 22 are located in the middle of the upper stem area. Apertures are designed to accommodate bolts 134 as shown in FIGS. 7–8.

The support bracket of the present invention may be attached to a structure so that the support bracket 2 hangs therefrom and saddle surface 10 can easily accommodate cables 12 thereon. Several different attachment techniques are contemplated for the support brackets of the present invention. As shown in FIGS. 7–8, support bracket 2 is attached to structure 50 by a pair of hangers 30 and clips 32. Support bracket 102 is attached to structure 50 by conventional fasteners such as bolts 134 and nuts 136.

In one embodiment of the present invention, a pair of hangers 30 and clips 32 are provided to secure the support bracket 2 to a desired structure, such as mounting bracket 50 or a wall. As shown in FIGS. 7–8, to secure bracket 2 to the desired structure, clips 32 are inserted into apertures 52 of structure 50 and hangers 30 snap into apertures 52 to securely fasten support bracket 2 to structure 50.

Figure 8:
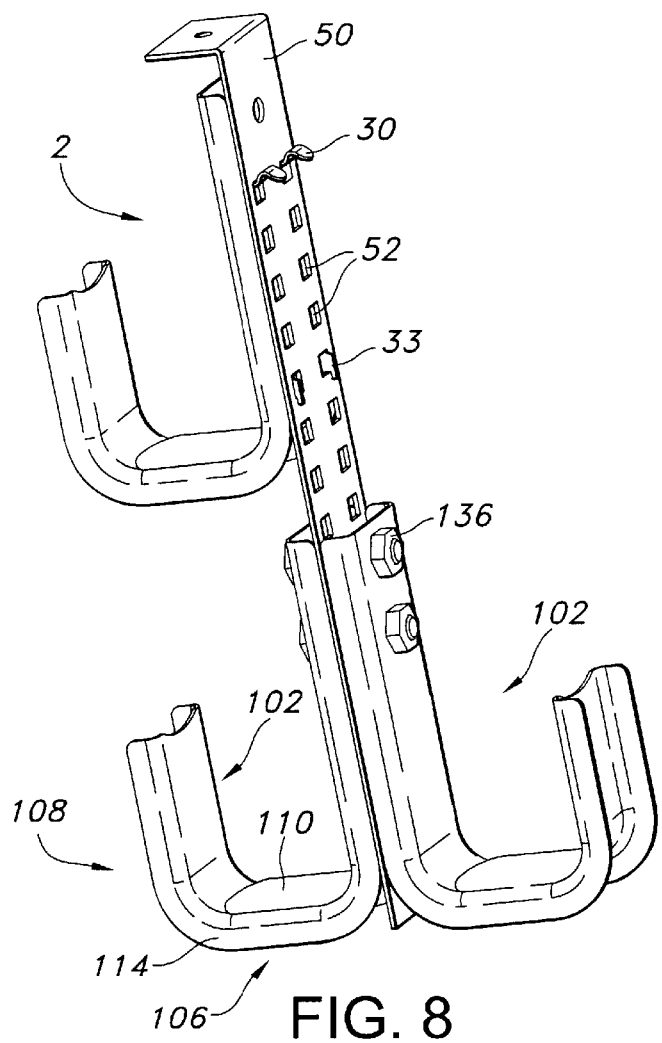
FIG. 8 is a perspective view of a number of cable support brackets of the present invention secured to a hanging structure.
Figure 5:
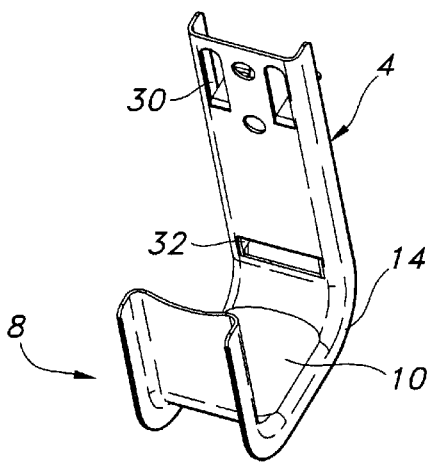
FIG. 5 is a perspective view of the cable support bracket of the present invention.
Figure 6:
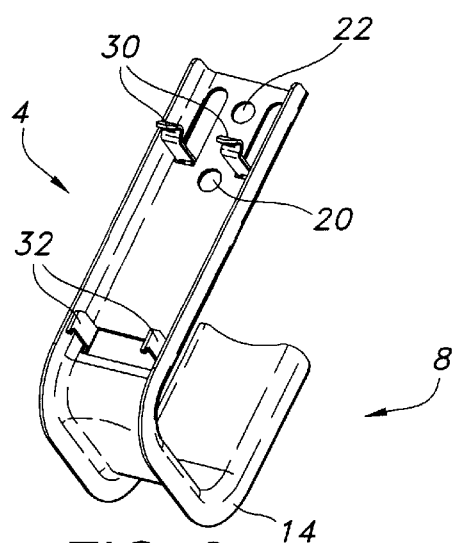
FIG. 6 is a perspective view of the cable support bracket of the present invention.

Hangers 30 and clips 32, as shown in FIGS. 5–8, are integrally formed from the support bracket by a cut-out portion of the planar interior surface of stem portion 4. Hangers 30 and clips 32 extend outwardly in a generally perpendicular manner to stem 4 and away from saddle area 18. Hangers 30 are configured so that they can snap into place in accommodating aperture 52 and stay secured to the desired structure. Clips 32 have a pair of downwardly facing hooks 33 that latch into place against accommodating apertures 52. Desirably, support.bracket 2 is secured to a structure that has a configuration of apertures 52 that accommodate both brackets 30 and clips 32 of support bracket 2, as shown in FIGS. 7–8.

In another embodiment of the present invention, cable support bracket 102, as shown in FIGS. 7–8, has a plurality of apertures that accommodate fasteners therethrough. To secure the support bracket to a structure in this embodiment, fasteners 134 extend through aperture 22 and/or 24 and the desired structure. Desirably, support bracket 102 is secured to a structure that has a configuration of apertures that closely conform to the apertures of the support bracket. Useful fasteners include rivets, bolt fasteners and combinations thereof. In FIGS. 7–8, cable support bracket 102 is secured by bolts 134 and nuts 136.

An embodiment of the present invention provides for securing the cables in the saddle. In particular, a cable tie (not shown) may be used to secure the cables to the bracket support. More particularly, a cable tie can be wrapped about cables 12 supported on saddle surface 10 such that the cable tie extends from flange 14 at one edge of support bracket 2 near the transition between stem portion 4 and the laterally extending portion 6, wrapping around cable 12, and extending the cable tie to opposing flange 14 at other side edge of support bracket 2 near the transition between the end portion 8 and the laterally extending portion 6. Cable tie (not shown) contacts the cable and maintains the cable in a tight manner against the saddle surface 10 of laterally extending portion 6.

Figure 9:
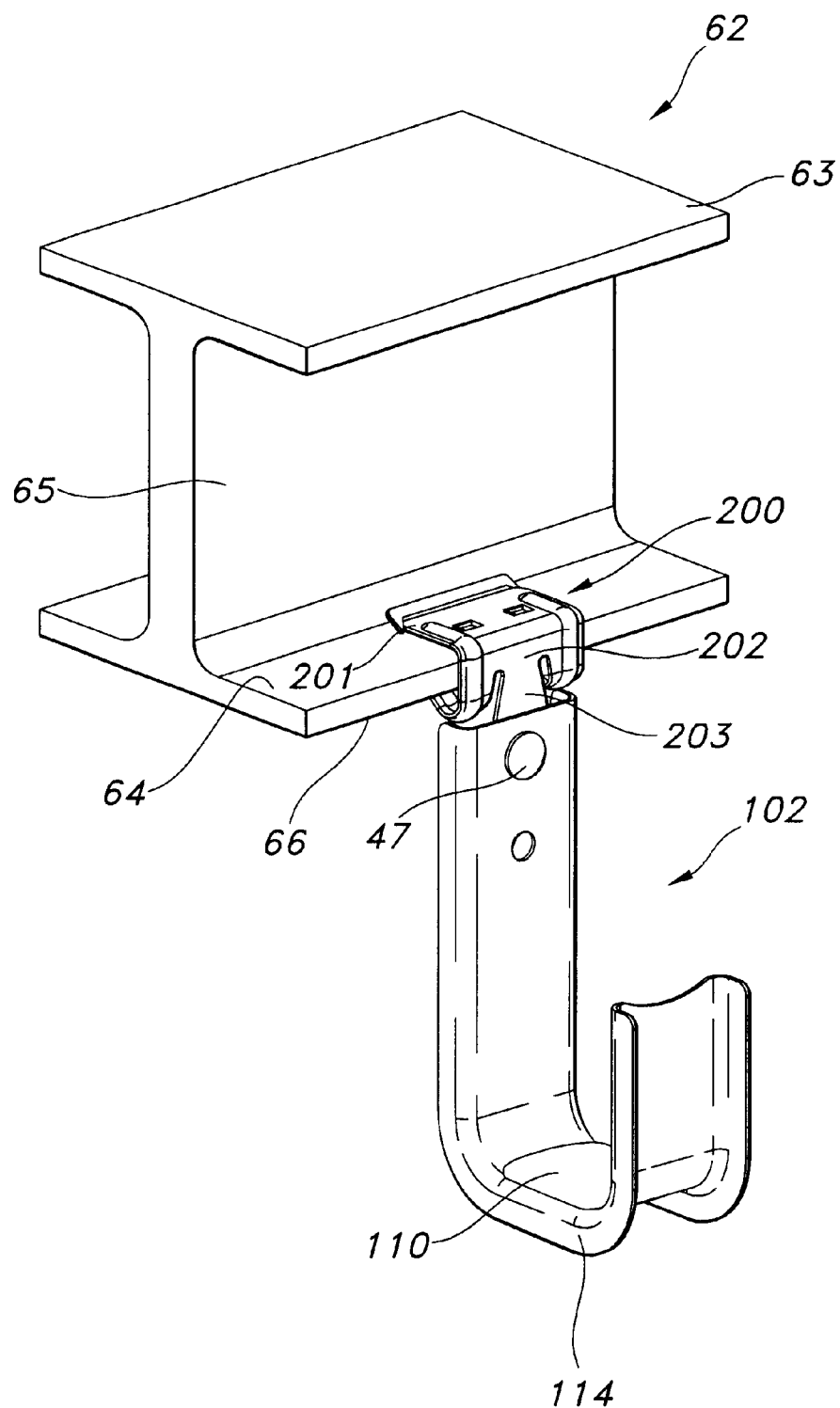
FIG. 9 is a perspective view of the cable support bracket of the present invention attached to a beam by a hammer-on beam flange clip.
Figure 10:
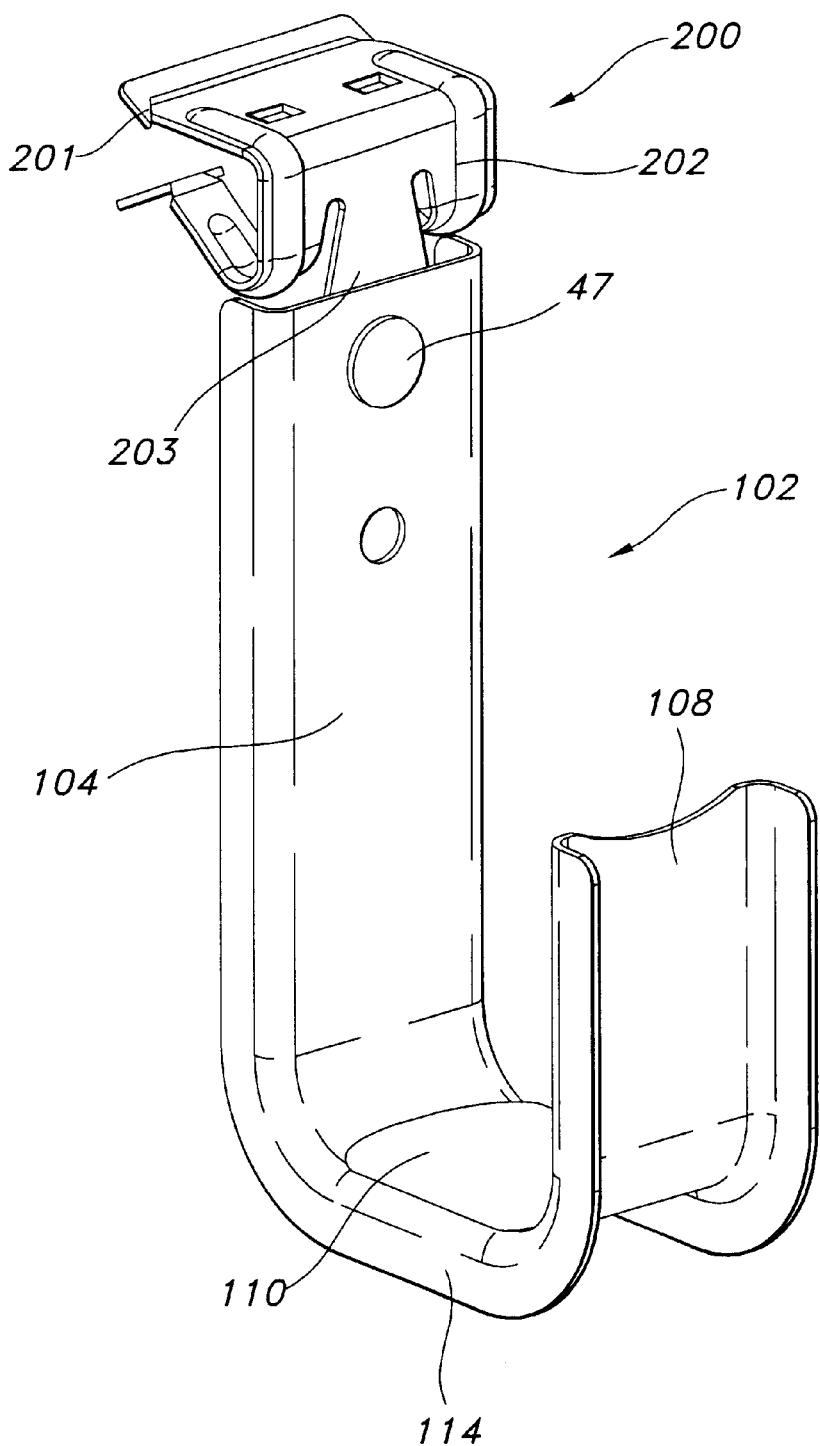
FIG. 10 is an enlarged view of the cable support bracket of the present invention attached to a hammer beam flange clip.

In FIG. 9, cable support bracket 2 is attached to a beam 62 which includes a top flange 63, a bottom flange 64 and a web 65 therebetween. The lower flange 64 has an edge 66 which is capable of receiving a variety of hammer-on or screw-on clamps or clips. In FIG. 9, support 102 is secured to bottom edge 66 of the bottom flange 64 by a hammer-on flange clip 200. Hammer-on flange clip 200 is generally U-shaped and is made of spring steel having flexible top and bottom legs which spread as the clip is hammered on the flange. The edges of the top and bottom legs are provided with barbs 201 which bite into the flange to resist removal. The clip may be hammered onto the flange edge simply by using a hammer to strike the bight portion 202 of the clip. The bight portion of the clip includes a downwardly extending tab 203 provided with an aperture which accommodates rivet 47. FIG. 10 shows a close up perspective view of cable support 102 connected to a hammer-on flange clip 200.

Figure 11:
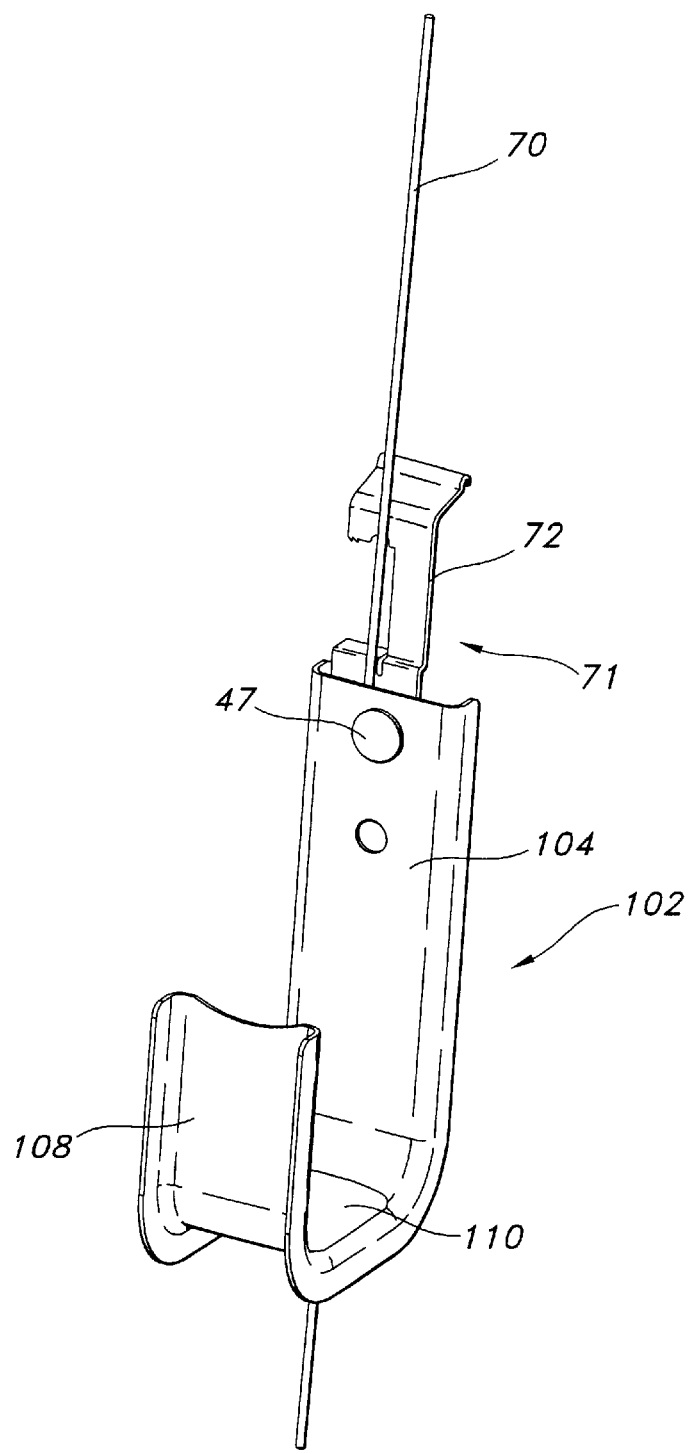
FIG. 11 is a perspective view of the cable support bracket of the present invention connected to clip in turn secured to a drop wire.
Figure 12:
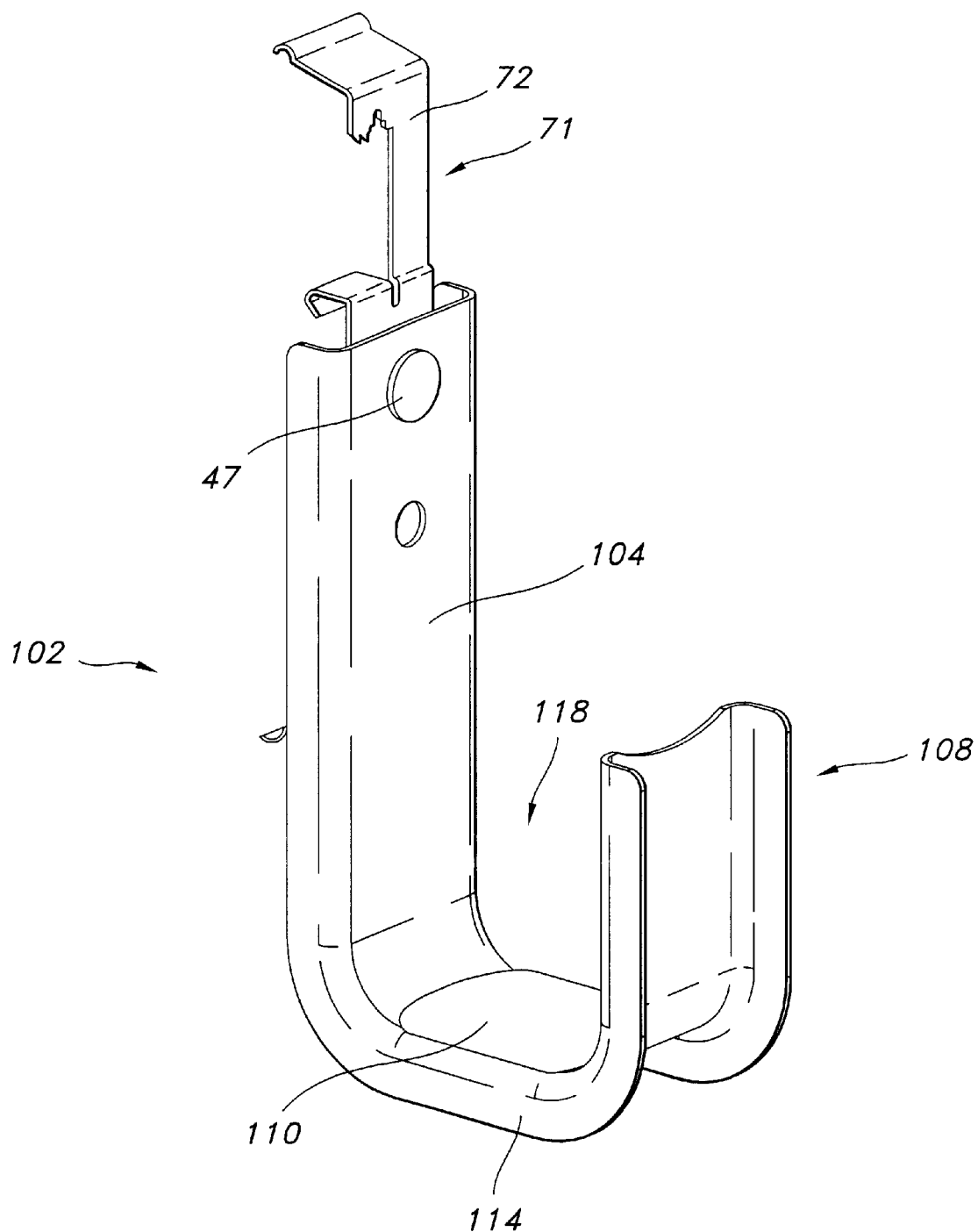
FIG. 12 is an enlarged perspective view of the cable support bracket of the present invention connected to clip useful for attaching the bracket to a drop wire.

FIG. 11 shows the cable support bracket of the present invention connected to a drop wire 70. Drop wires or rods are often used to support various items or utilities from structural components or ceilings. Cable support bracket 102 is connected by rivet 47 to clip 71 which is connected to drop wire 70. Rivet 47 is secured to the approximate middle of the clip and the clip includes upper and lower spring legs although only upper leg 72 is visible. Spring legs are bent toward each other to create a lateral notch opening for receipt of the drop wire and when the legs are released on the wire or rod, sharp notch edges bite into and grip drop wire 70. Clip 71 is typical of multi-function clips for securing various items to drop wires, rods or flanges. Cable support 102 may be positioned vertically anywhere along drop wire 70. FIG. 12 shows an expanded view of cable support 102 attached to clip 71 without a wire or rod attached thereto.

Figure 13:
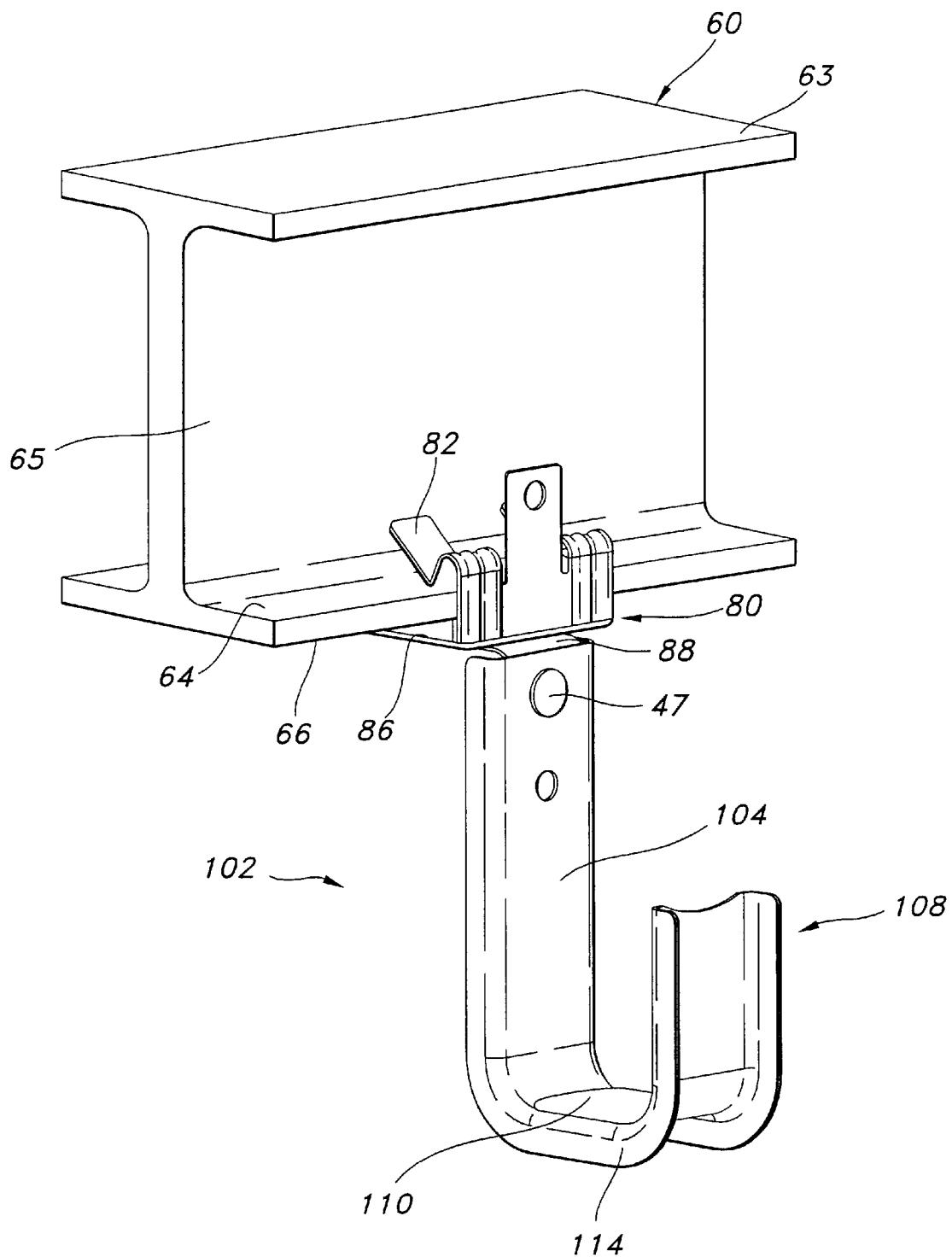
FIG. 13 is a perspective view of the cable support bracket of the present invention connected to a hammer-on beam flange clip secured to a beam flange.
Figure 14:
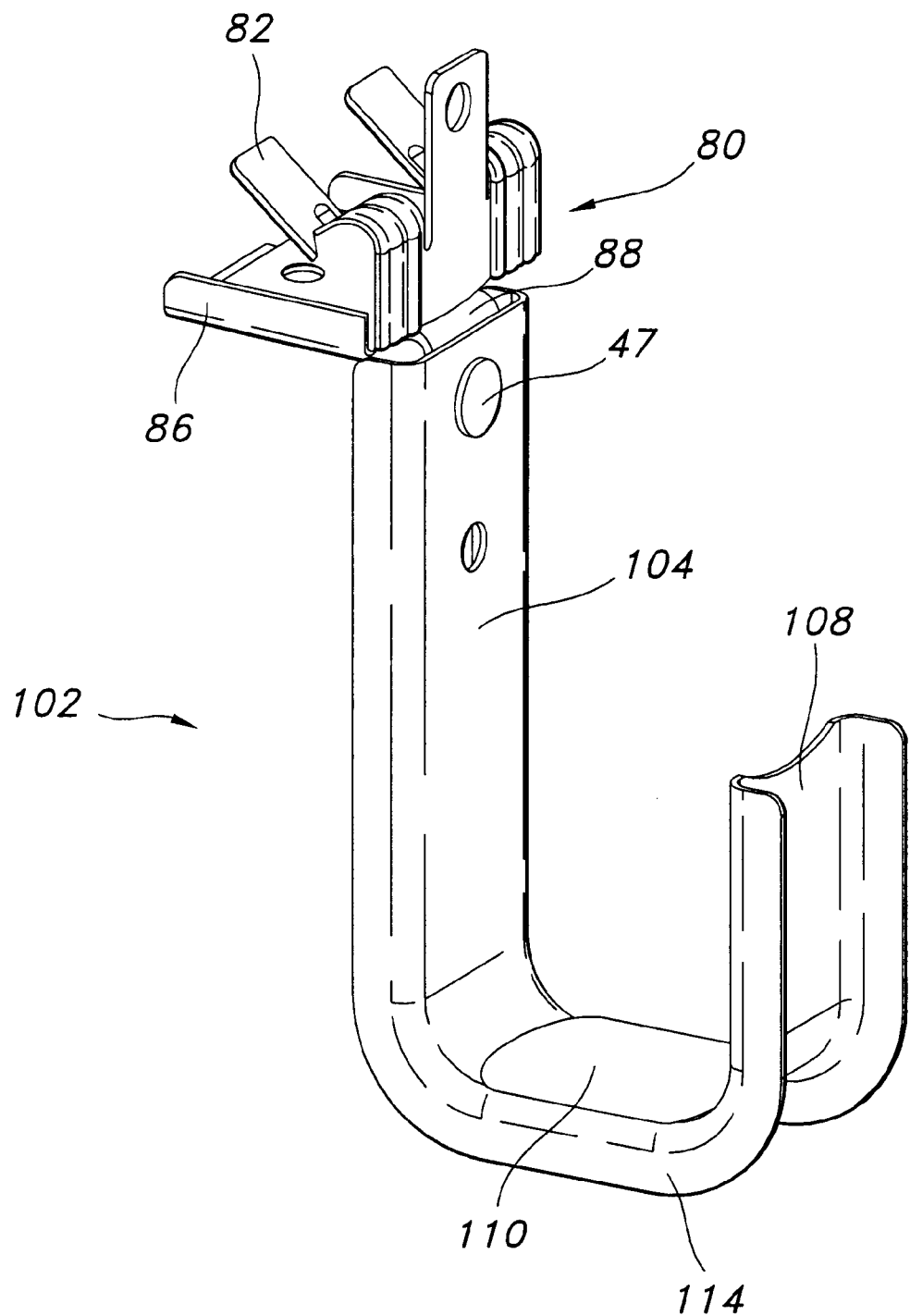
FIG. 14 is a perspective view of the cable support bracket of the present invention connected to a hammer-on beam flange clip useful in securing the bracket to a beam flange.

Referring to FIG. 13, cable support 102 is mounted to edge 64 of beam 62 via a hammer-on clip 80, similar to clip 200 in FIG. 9. Cable support 102 is secured to clip 80 by the face of vertical leg 88 by rivet 47. Support bracket is secured to bottom edge 66 by hammer-on flange clip 80. Flange clip 80 is generally U-shaped and is made of spring steel having flexible top and bottom legs which spread as the clip is hammered on flange 64. The edges of the top and bottom legs are provided with barbs 82 which bite into flange 64 to resist removal. An enlarged view of clip 80 attached to cable support 102 is shown in FIG. 14.

Figure 15:
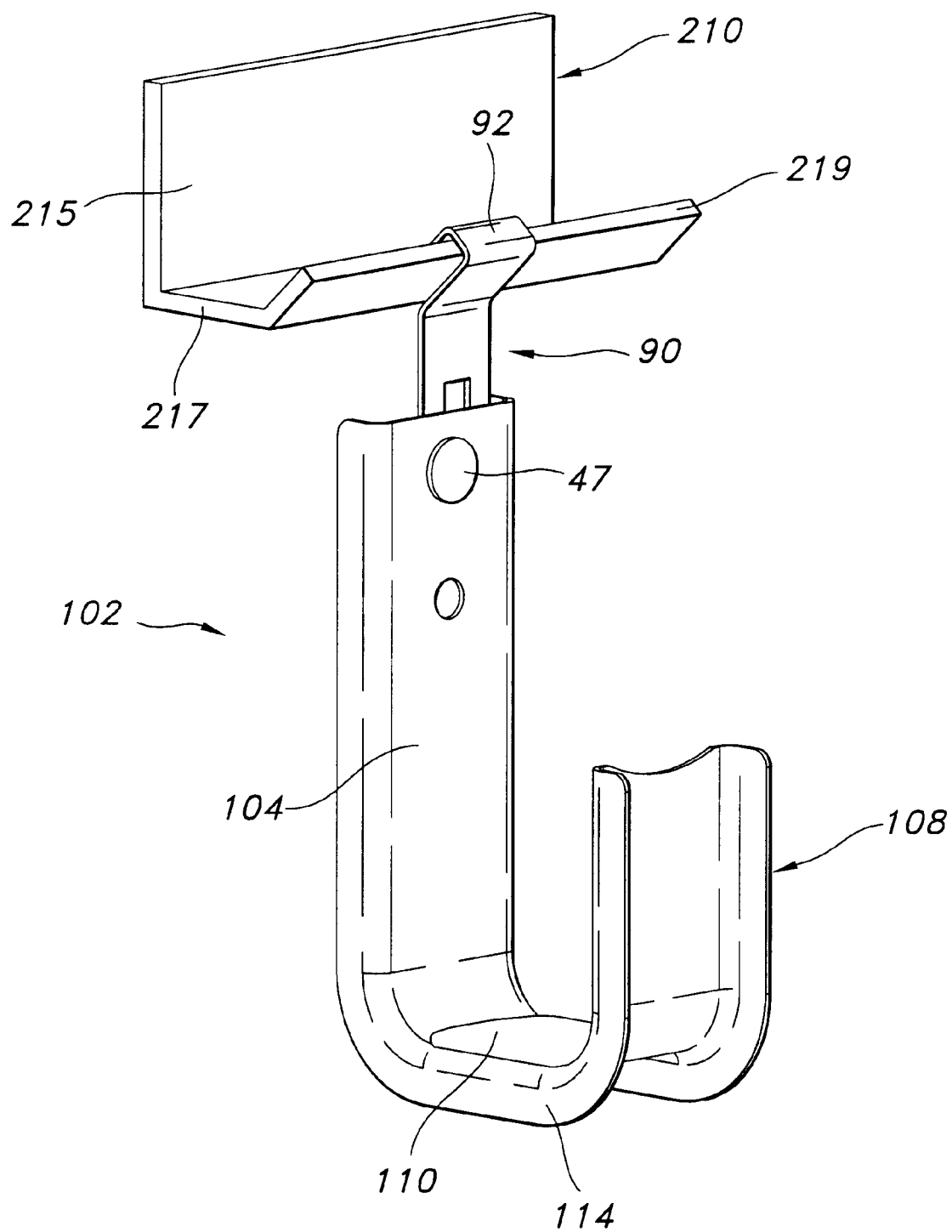
FIG. 15 is a perspective view of the cable support bracket of the present invention connected to a clip suspended from a beam.
Figure 16:
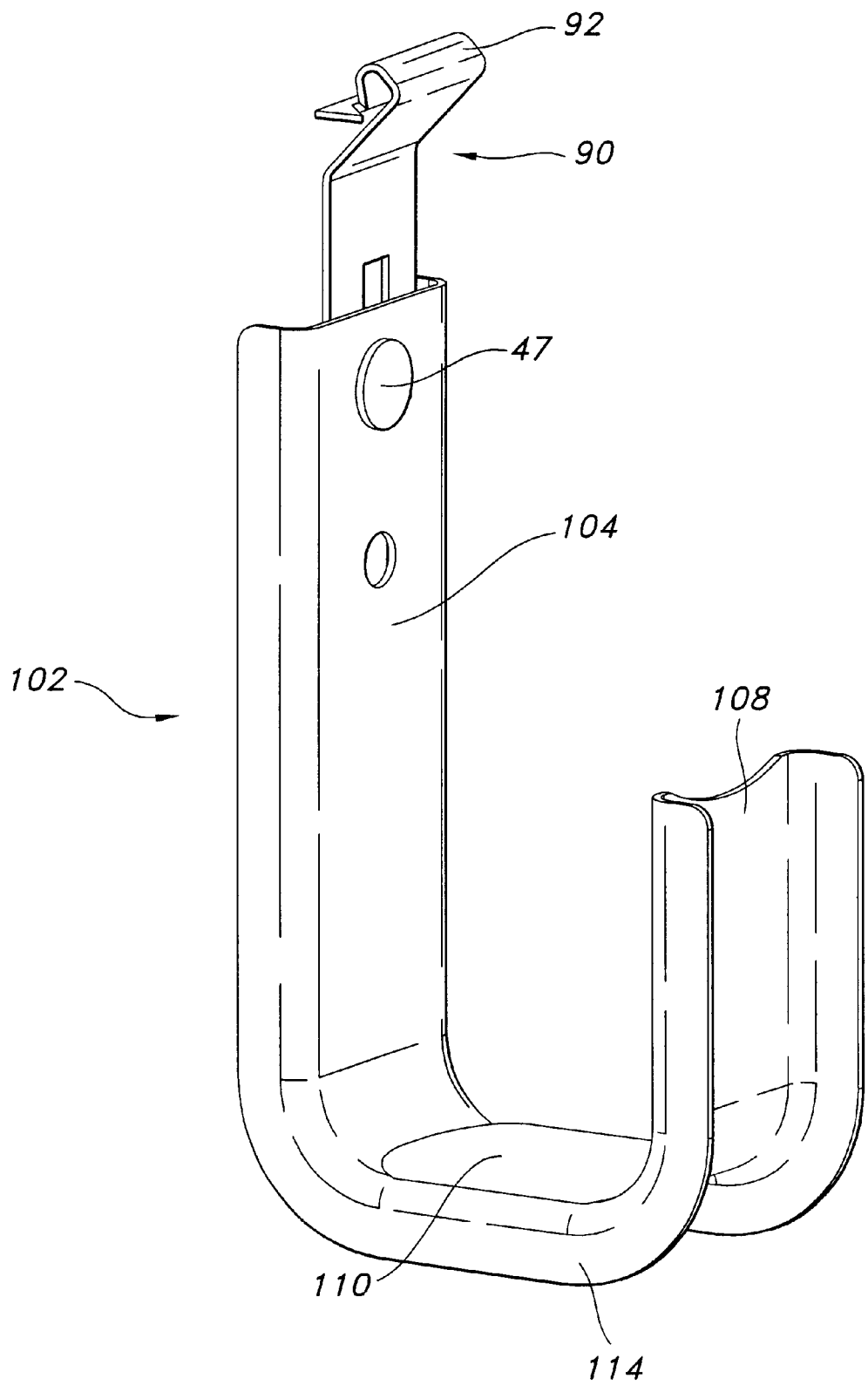
FIG. 16 is an enlarged perspective view of the cable support bracket of the present invention connected to a clip useful for suspending the bracket from a beam.

FIG. 15 illustrates beam 210 which has a vertical web 215 and opposite horizontal flange 217 which terminate in angled flange 219. Cable support 102 is connected to clip 90 by rivet 47. Clip 90 has a top hook 92 which snaps over edge of flange 219. Hook 92 includes barbs adapted to bite into the flange 219 to resist withdrawal. FIG. 16 is an enlarged view of clip 90 as attached to cable support 102.

Figure 17:
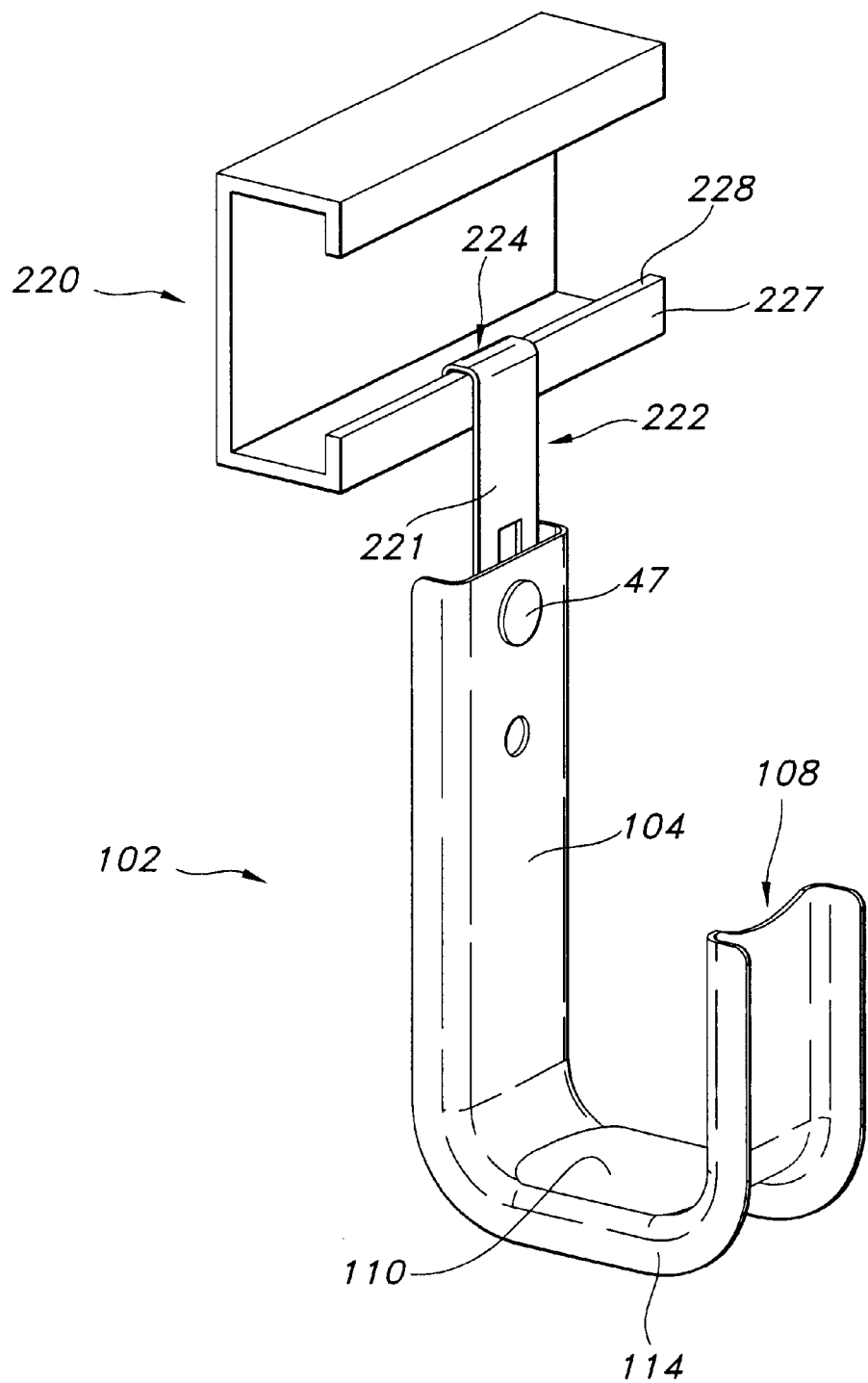
FIG. 17 is a perspective view of the cable support bracket of the present invention connected to a clip suspended from a C-purlin.
Figure 18:
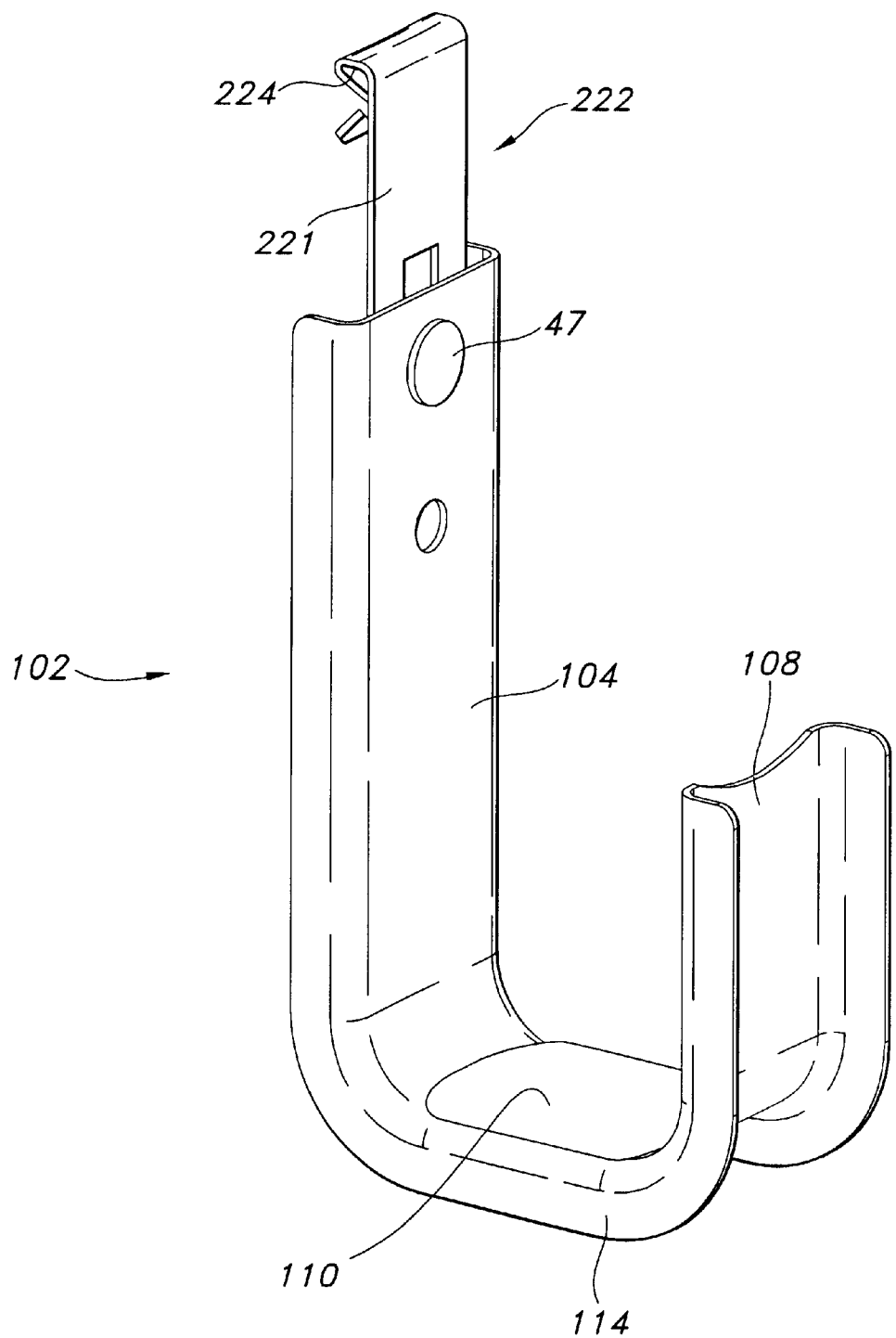
FIG. 18 is an enlarged perspective view of the cable support bracket of the present invention connected a clip useful in suspending the bracket from a C-purlin.

Cable support 102 is connected to C-purlin structure 220 by a C-purlin clip 222, as shown in FIG. 17. C-purlin 220 is a C-shaped structure and includes an upturned flange 227 having edge 228. Cable support 102 is attached to the lower end of C-purlin clip 222 with rivet 47. Upper end 221 of C-purlin clip 222 includes a hook 224 with barbed edges which fits over edge 228 and such barbed edges resist dislocation. FIG. 18 is an enlarged view of cable support 102 attached to C-purlin clip 222.

Figure 19:
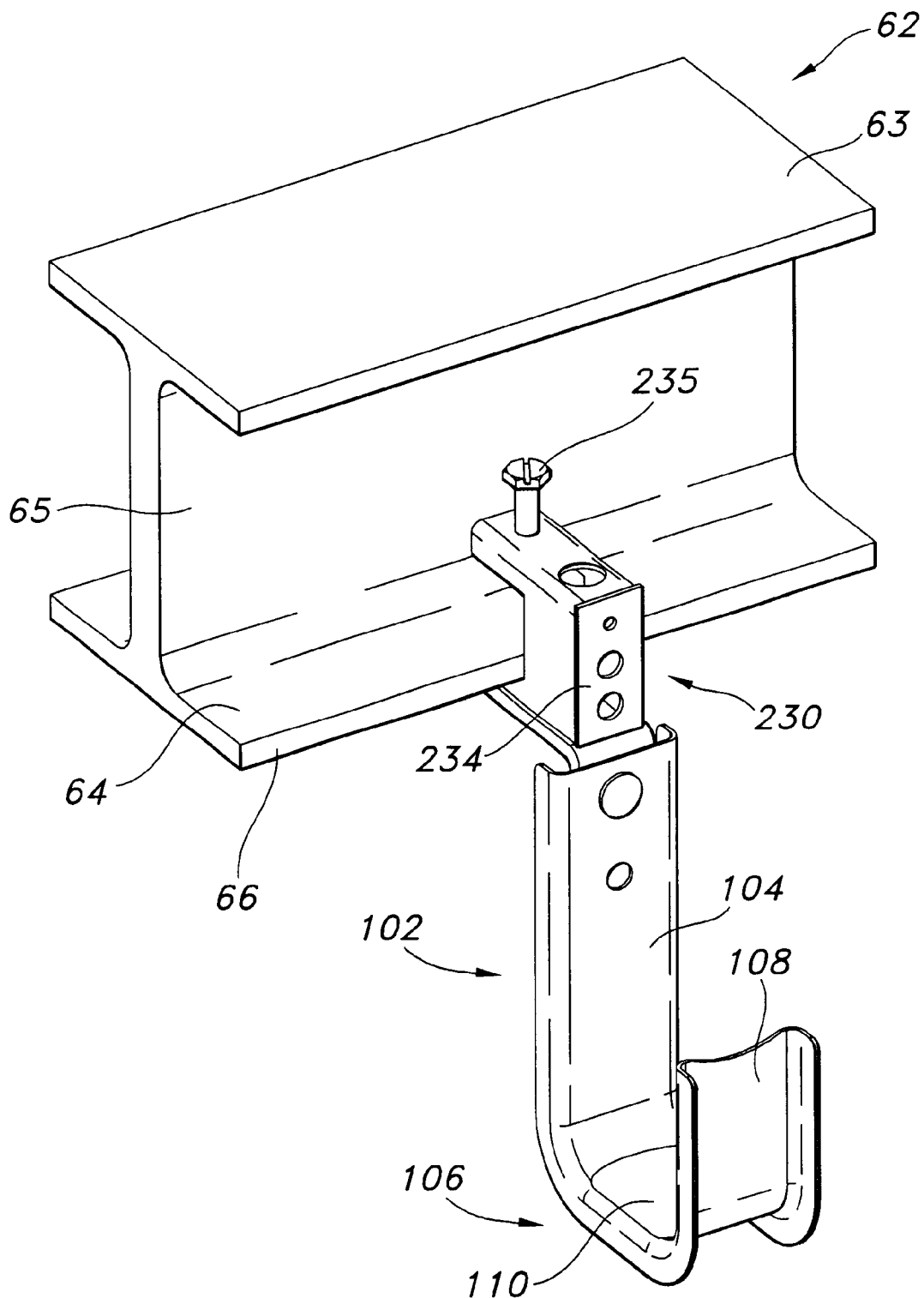
FIG. 19 is a perspective view of the cable support bracket of the present invention secured to a screw on beam flange clamp.
Figure 20:
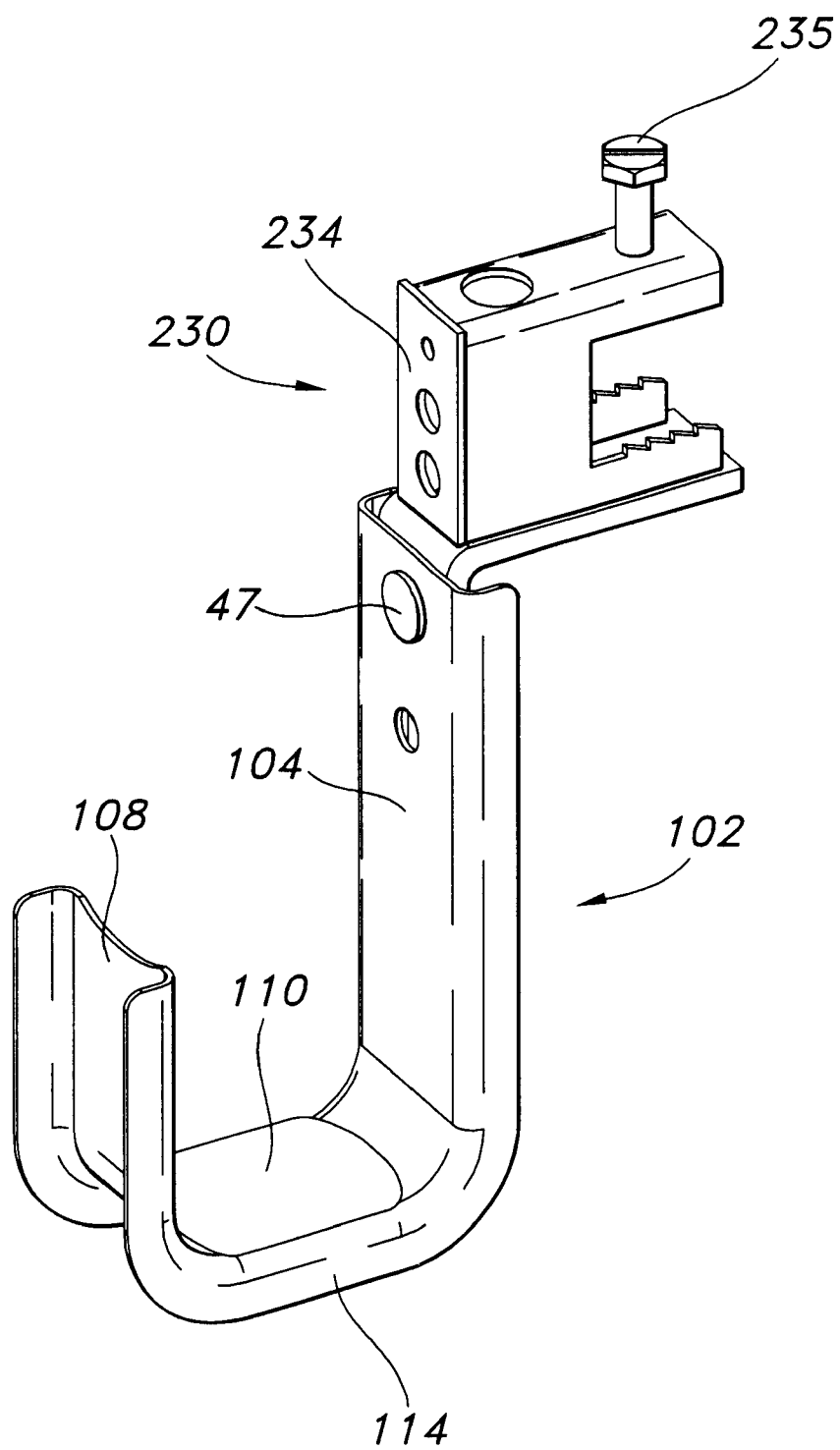
FIG. 20 is an enlarged perspective view of the cable support bracket of the present invention secured to a screw on beam flange clamp.

FIGS. 19–20 show cable support 102 attached to screw-on beam hanger 230. As illustrated in FIG. 19, screw-on beam hanger is useful in attaching cable support 102 to beam 62 onto edge 66. As shown in FIG. 20, screw-on hanger 230 has bolt 235 threaded above and projecting into mouth 236 of screw-on hanger 230. The lower edge of mouth 236 is defined by teeth 237. Cable support bracket 102 is secured to beam 62 by tightening screw 235 onto edge 66 so that screw and teeth bite into beam 62. Hanger 230 is secured to cable support 102 by rivet 47. FIG. 20 shows an enlarged view of cable support 102 as attached to screw-on hanger 230.

Figure 21:
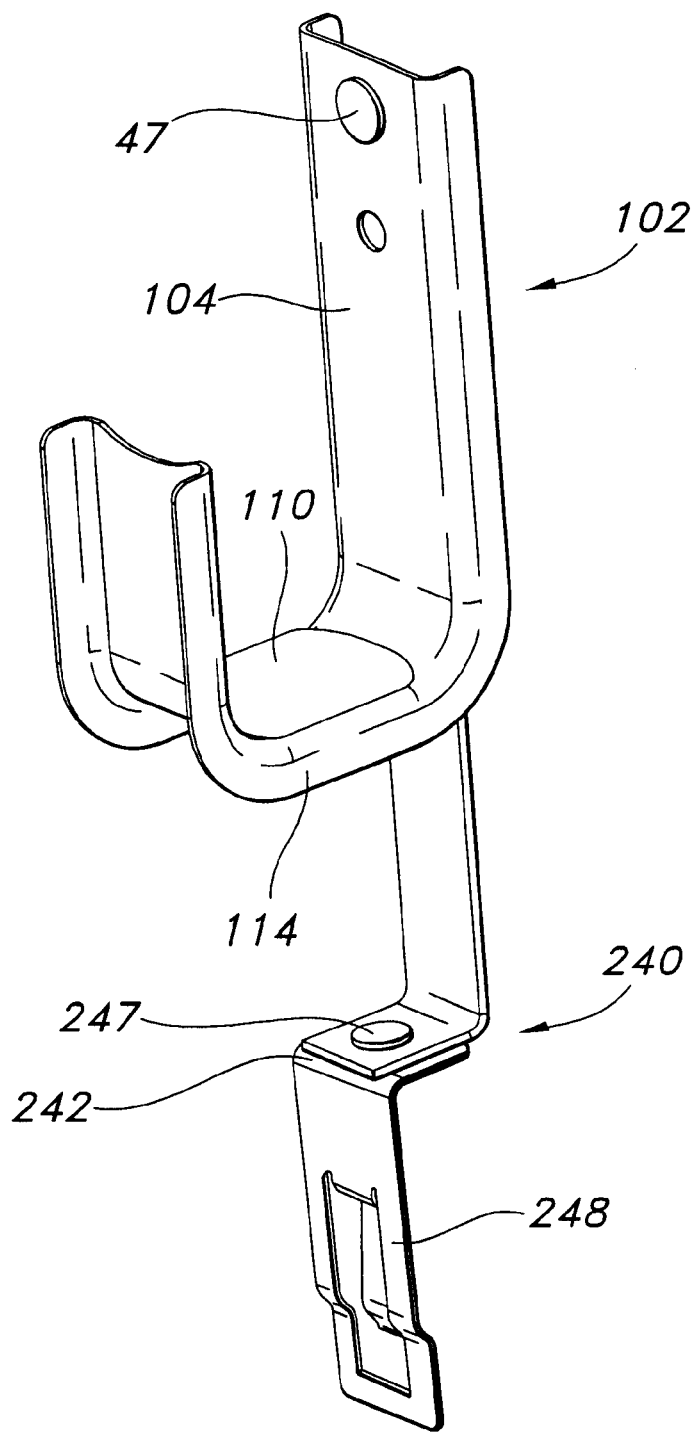
FIG. 21 is a perspective view of the cable support bracket of the present invention secured to a bracket attachment.

FIG. 21 shows cable support 102 secured to bracket attachment 240 by rivet 47. Bracket attachment 240 bends at surface 242 and is connected to clip 248 by rivet 247. Bracket attachment 240 attaches to a structure by clip 242.

The support bracket of the present invention is preferably made of a metallic material and desirably formed from a continuous strip of metal. The strips of metal are formed and then the support bracket is formed by appropriately shaping of the metal strip. The shaped support bracket may be heat treated and then coated or galvanized. Spring steel or stainless steel may be employed to make the saddle support.

The invention being thus described, it will now be evident to those skilled in the art that the same may be varied in many ways. Such variations are not to be regarded as a departure from the spirit and scope of the invention and all such modifications are intended to be included within the scope of the following claims.

What is claimed:

1. A cable support bracket having a hook-like shaped body comprising:

an elongate stem portion;

an elongate laterally extending portion extending generally perpendicularly from one end of the stem portion;

an elongate up-turned end portion extending perpendicularly from one end of the laterally extending portion generally parallel to said stem portion; and said stem portion, said laterally extending portion and said end portion defining a cable support saddle, which is contiguous with both the stem portion and the up-turned end portion, for accommodating cables thereacross, said laterally extending portion including a convex cable support surface for maintaining a gradual bend radius for said cables extending thereacross;

wherein said bracket comprises at least one pair of hangers extending outward away from said saddle integrally formed from the support bracket by a cut out portion of said stem.

2. The cable support of claim 1, wherein said laterally extending portion is contiguous with both said stem and said end portion; and a pair of outwardly extending contiguous reinforcing flanges along longitudinal edges thereof.

3. The cable support bracket of claim 1, wherein said reinforcing flanges are generally perpendicular said stem portion, said laterally extending portion and said end portion.

4. The cable support bracket of claim 1, further including attachment means to attach said stem to a structure.

5. The cable support of claim 1, wherein said stem includes a plurality of fastener apertures for accommodating fasteners.

6. The cable support bracket of claim 1, wherein said bracket comprises a set of clips extending outward away from said saddle integrally formed from said support bracket by a cutout portion of said stem.

7. The cable support bracket of claim 1, wherein said bracket has at least one aperture on said stem for accommodating a fastener.

8. The cable support bracket of claim 7, wherein said fastener is a rivet.

9. A cable support bracket having a hook-like shaped body comprising:

an elongate stem portion;

an elongate laterally extending portion extending generally perpendicularly from one end of the stem portion;

an elongate up-turned end portion extending perpendicularly from one end of the laterally extending portion generally parallel to said stem portion; and said stem portion, said laterally extending portion, said end portion defining a cable support saddle, which is contiguous with both the stem portion and the up-turned end portion, for accommodating cables thereacross, said laterally extending portion including a convex cable support for maintaining a gradual bend radius for said cables extending thereacross; said stem including means for securing said body to a structural member;

wherein said means includes at least one pair of hangers integrally formed from said bracket a cut out portion of said stem portion.

10. The cable support bracket of claim 9, wherein said means includes a set of clips integrally formed from said bracket by a cut-out portion of said stem useful for securing said bracket to a structure.

11. The cable support bracket of claim 9, wherein said means includes at least one aperture in said stem for accommodating a fastener for securing said bracket to a structure.

* * * * *